Patented Aug. 17, 1948

2,447,372

UNITED STATES PATENT OFFICE 2,447,372

CARBAMYL CHLORIDE AND METHOD OF PRODUCING SAME

Robert J. Slocombe and Edgar E. Hardy, Anniston, Ala.

No Drawing. Application January 16, 1946, Serial No. 641,630

7 Claims. (Cl. 260—544)

The present invention relates to carbamyl chloride and to an improved method for producing same.

Heretofore carbamyl chloride has been prepared by reacting phosgene with ammonia or ammonium chloride at a temperature of about 400° C. These methods, however, have not achieved commercial success as excessive amounts of ammonium chloride are either formed or volatilized during the reaction with the result that the yield of carbamyl chloride is not only substantially decreased, but the system is clogged with ammonium chloride in a relatively short time.

Now we have developed an economical and commercially feasible process for making carbamyl chloride which has none of the objectionable features enumerated above. This process involves reacting phosgene and ammonia in the gaseous phase and at a temperature of at least 450° C. By employing temperatures of this magnitude, the production of ammonium chloride is reduced to a minimum, thereby resulting in a marked increase in yield of carbamyl chloride. Moreover, as only small quantities of ammonium chloride are produced, the problem of clogging the system with this material is eliminated. These results are surprising since at equilibrium and at 450° C. or higher temperatures phosgene is at least 44.6% dissociated, and under these conditions it would normally be expected that, upon reaction with ammonia, the formation of ammonium chloride would be favored and that instead of markedly increasing the yield of carbamyl chloride, the yield of this compound would be substantially decreased.

For a more complete understanding of the present invention reference is made to the following specific example.

Example

Phosgene and gaseous ammonia were continuously charged for a period of 1 hour into an electrically heated glass reactor tube where they were intimately mixed and reacted at a temperature of about 500° C., the phosgene and ammonia being introduced into the reactor at a rate of 3.6 moles and 2.4 moles per hour respectively.

The resulting gaseous product was passed through a water-cooled condenser operated at a temperature of about 22° C. to separate the carbamyl chloride by condensation.

The condensed carbamyl chloride was collected and slowly heated up to 190° C. and 91 grams of cyanuric acid was obtained. This represented a product yield of 88.5% of theory, basis ammonia, and demonstrated that the yield of carbamyl chloride was at least 88.5% of theory.

The reaction between phosgene and gaseous ammonia is carried out at a temperature of at least 450° C. and preferably at a temperature of from 500° C. to 525° C. However, higher temperatures may also be employed if desired.

The phosgene and ammonia are preferably reacted together in a molecular ratio of 1.5 moles of phosgene to 1 mole of ammonia, but very satisfactory results are also obtainable when a phosgene/ammonia molecular ratio of from 1.1 to 2.0 is employed. Larger or smaller ratios are likewise within the scope of the invention, but when smaller ratios are employed, the theoretical requirements at least should be met.

As indicated above, carbamyl chloride may be converted into cyanuric acid by heating. This operation may be carried out in any manner known to those skilled in the art, but it is preferably accomplished by slowly heating the carbamyl chloride on an oil bath to 190° C. to 200° C. for a period of about 3 hours.

In addition to the production of cyanuric acid, carbamyl chloride may be employed in the manufacture of many other compounds of commercial significance. For example, it may be reacted with aliphatic alcohols, alicyclic alcohols and hydroxy-aromatic compounds to form urethanes; with aliphatic amines, alicyclic amines and aromatic amines to prepare substituted ureas; and with aromatic hydrocarbons, in the presence of a Friedel-Crafts catalyst, to produce acid amides.

The above description and example are intended to be illustrative only. Any modification or variation therefrom which conforms to the spirit of the invention is intended to be included within the scope of the claims.

We claim:

1. The process of producing carbamyl chloride which comprises reacting phosgene with ammonia in a phosgene/ammonia molecular ratio of at least 1, said reaction being carried out in the gaseous phase and at a temperature of at least 450° C.

2. The process of producing carbamyl chloride which comprises reacting phosgene with ammonia in a phosgene-ammonia molecular ratio of from 1.1 to 2.0, said reaction being carried out in the gaseous phase and at a temperature of at least 450° C.

3. The process of producing carbamyl chloride which comprises reacting phosgene with ammonia in a phosgene-ammonia molecular ratio of about 1.5, said reaction being carried out in the gaseous phase and at a temperature of at least 450° C.

4. The process of producing carbamyl chloride which comprises reacting phosgene with ammonia in a phosgene/ammonia molecular ratio of at least 1, said reaction being carried out in the gaseous phase and at a temperature of about 500° C.

5. The process of producing carbamyl chloride which comprises reacting phosgene with ammonia in a phosgene/ammonia molecular ratio of about 1.5, said reaction being carried out in the gaseous phase and at a temperature of about 500° C.

6. The process of producing carbamyl chloride which comprises reacting phosgene with ammonia in a phosgene/ammonia molecular ratio of from 1 to 2, said reaction being carried out in the gaseous phase and at a temperature of from 450 to 525° C.

7. The process defined in claim 6 wherein the reaction is carried out at a temperature of 510° C.

ROBERT J. SLOCOMBE.
EDGAR E. HARDY.

REFERENCES CITED

The following references are of record in the file of this patent:

Karrer, "Organic Chemistry," pages 206–207.
Beilstein, vol. 26, 4th edition, pages 239–240.
Heilbron, Dictionary of Organic Compounds, vol. 1, page 395.